G. A. MORISON & N. A. AUKER.
Fire-Extinguisher.

No. 219,592.     Patented Sept. 16, 1879.

Witnesses
Wm H Coolidge
Charles E Foe

Inventor
George A. Morison
Nicholas A. Auker

UNITED STATES PATENT OFFICE.

GEORGE A. MORISON AND NICHOLAS A. AUKER, OF JERSEY CITY, N. J.

IMPROVEMENT IN FIRE-EXTINGUISHERS.

Specification forming part of Letters Patent No. 219,592, dated September 16, 1879; application filed March 3, 1879.

*To all whom it may concern:*

Be it known that we, GEORGE A. MORISON, of Jersey City, in the county of Hudson and State of New Jersey, and NICHOLAS A. AUKER, of the same place, have jointly invented a new and useful Improvement in Fire-Extinguishers, of which the following, taken in connection with the accompanying drawings, is a full, clear, and accurate description.

Figure 1:
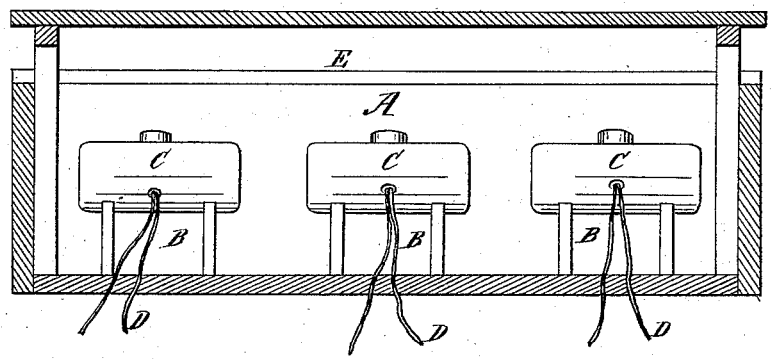
Figure 2:
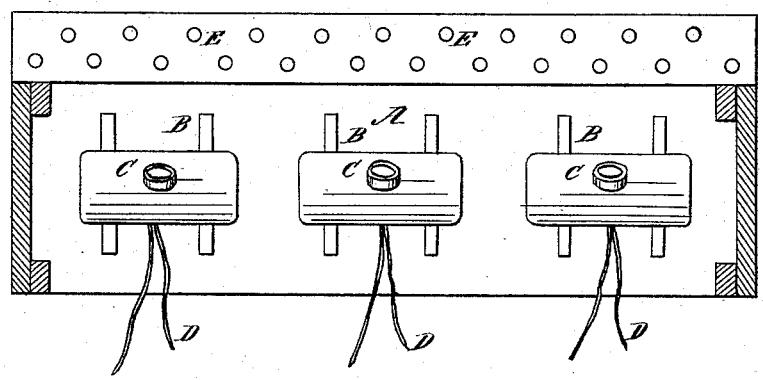

In the drawings, Figure 1 represents a front view of our improvement; Fig. 2, a sectional view thereof.

Our fire-extinguishers consist of boxes or receptacles A, of any suitable material, which are attached to the ceiling or sides (one or more) of any room or apartment in the house or place which it is desired to protect from fire. This box or receptacle A may be divided into compartments B, in which is placed bicarbonate of soda; or the box B may be made without compartments, and the bicarbonate of soda placed in the bottom of the box. We prefer to make the box B with compartments, as in this case the bicarbonate of soda is held more securely when the box B is provided with them, and at the same time the compartments form rests for the glass vessels C. These glass vessels C either rest upon and are secured to the top of the compartments B, or are secured in any proper manner at the upper portion of the box B. They contain sulphuric acid.

Attached to a cap provided with any explosive material, and inserted in the bottom or other part of these glass vessels C, are two wires, D, which connect with the positive and negative poles of an electric battery. They can connect with any electric alarm-battery, either within or without the building in which the boxes B are placed, or with a dynamo-electric machine provided for this especial purpose.

When a fire takes place the electric circuit is closed between the positive and negative poles of the battery, and the electricity thus generated explodes the caps inserted in the glass vessels C and breaks the said vessels C. The sulphuric acid contained in them combines with the bicarbonate of soda in the box B, and thus produces carbonic-acid gas, which escapes from the upper back portion of the box and through the openings E, and smothers and extinguishes the fire.

The box B is closed, with the exception of its upper back portion and the opening E.

A covering of oil-silk or other suitable material is placed in the box above the bicarbonate of soda, to prevent it losing its strength from exposure to the atmosphere.

One of these extinguishers can be placed on each floor of a building, and by pulling or operating knobs which designate by numbers the different floors, and which knobs are so arranged as, when pulled or operated on, to close the circuit of an electric battery, a fire occurring on any floor of a building can be readily extinguished. Our fire-extinguishers can also be placed in the hold of a ship or vessel, and any fire occurring there can be readily extinguished.

Having thus described our invention, what we claim, and desire to secure by Letters Patent, is—

1. The box A, with or without the compartments B, and provided with the glass vessels C, connected by wires D with the poles of an electric battery, substantially as described, and for the purposes above set forth.

2. The box A, with openings E, with or without the compartments B, and provided with the glass vessels C, connected by wires D with the poles of an electric battery, substantially as described, and for the purposes above set forth.

In testimony whereof we have hereunto set our hands this 1st day of March, 1879.

GEORGE A. MORISON.
NICHOLAS A. AUKER.

In presence of—
WM. H. COOLIDGE,
CHARLES G. COE.